(12) United States Patent
Tanimoto

(10) Patent No.: US 7,027,176 B2
(45) Date of Patent: Apr. 11, 2006

(54) INTERNET FACSIMILE MACHINE, COMMUNICATION METHOD OF INTERNET FACSIMILE MACHINE, RECORDING MEDIUM CAPABLE OF READING BY COMPUTER THE RECORDED COMMUNICATION METHOD OF INTERNET FACSIMILE MACHINE

(75) Inventor: Yoshifumi Tanimoto, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 900 days.

(21) Appl. No.: 10/000,555

(22) Filed: Oct. 23, 2001

(65) Prior Publication Data

US 2002/0080414 A1    Jun. 27, 2002

(30) Foreign Application Priority Data

Oct. 27, 2000  (JP)  ............................ 2000-329082
Oct. 27, 2000  (JP)  ............................ 2000-329083
Oct. 27, 2000  (JP)  ............................ 2000-329084

(51) Int. Cl.
  G06F 15/00   (2006.01)
  H04N 1/00    (2006.01)
  H04M 11/00   (2006.01)

(52) U.S. Cl. .................... 358/1.15; 358/402; 358/405; 358/437; 358/1.16; 379/93.24; 379/100.08

(58) Field of Classification Search ............... 358/1.15, 358/402, 1.16, 405, 437; 379/93.24, 100.01, 379/88.08, 100.06, 100.08
See application file for complete search history.

(56) References Cited

U.S. PATENT DOCUMENTS 6,381,038 B1 *   4/2002  Endo ........................ 358/400
6,437,873 B1 *   8/2002  Maeda ..................... 358/1.15
6,785,017 B1 *   8/2004  Yoshiura ................. 358/1.15

FOREIGN PATENT DOCUMENTS

| JP | 03-231556 | 10/1991 |
| JP | 11-065963 | 3/1999 |
| JP | 11-127330 | 5/1999 |
| JP | 11-184767 | 7/1999 |
| JP | 11-261628 | 9/1999 |
| JP | 2000-259513 | 9/2000 |
| JP | 2001313778 A | * 11/2001 |

* cited by examiner

Primary Examiner—Kimberly Williams
Assistant Examiner—Thomas J Lett
(74) Attorney, Agent, or Firm—Hogan & Hartson, L.L.P.

(57) ABSTRACT

In the Internet facsimile communication system, to exchange the functions of one another between the transmitting side and the receiving side, the Internet facsimile machine 20 carries out facsimile communication by using an electronic mail via the Internet. The principal control unit 1 exchanges the ability of the facsimile machine with that of the other end by using the electronic mail with the same communicating procedure as the communicating procedure of ITU-T recommendation T-30 used in the facsimile communication, and transmits an image data according to the exchanged ability of each facsimile machine. The electronic mail includes the FAXID (facsimile communication identifying number) which is the data for identifying the series of facsimile communication.

17 Claims, 18 Drawing Sheets

FIG. 3

FAXID MANAGEMENT
TABLE 8a

| X – FAXID | OTHER END OF COMMUNICATION | START TIME | FINISH TIME |
|---|---|---|---|
| 000001@xxx.co.jp | james@xyz.co.jp | 2000.09.01, 10:25:30 | 2000.09.01, 10:27:00 |
| 000002@xxx.co.jp | henry@abc.com | 2000.09.01, 10:30:00 | — |
| . . . . . | . . . . . | . . . . . | . . . . . |

COMMUNICATION RECORD
TRANSMISSION TABLE 8b

| X-FAXID | OTHER END OF COMMUNICATION | COMMUNICATION TIME | SIGNAL | TX/RX |
|---|---|---|---|---|
| 000001@xxx.co.jp | james@xyz.co.jp | 2000.09.01, 10:25:30 | X-FAXCALL | TX |
| 000001@xxx.co.jp | james@xyz.co.jp | 2000.09.01, 10:26:00 | X-DIS | RX |
| 000001@xxx.co.jp | james@xyz.co.jp | 2000.09.01, 10:26:20 | X-DCS, X-PIX, X-EOP | TX |
| 000001@xxx.co.jp | james@xyz.co.jp | 2000.09.01, 10:26:50 | X-MCF | RX |
| 000001@xxx.co.jp | james@xyz.co.jp | 2000.09.01, 10:27:00 | X-DCN | TX |
| 000002@xxx.co.jp | henry@abc.com | 2000.09.01, 10:30:00 | X-FAXCALL | TX |
| ... | ... | ... | ... | ... |

FIG. 4

COMMUNICATION RECORD
RECEIVING TABLE 8c

| X-FAXID | OTHER END OF COMMUNICATION | COMMUNICATION TIME | SIGNAL | TX/RX |
|---|---|---|---|---|
| 123456@aaa.co.jp | edward@aaa.co.jp | 2000.09.01, 11:40:00 | X-FAXCALL | RX |
| 123456@aaa.co.jp | edward@aaa.co.jp | 2000.09.01, 11:40:10 | X-DIS | TX |
| 123456@aaa.co.jp | edward@aaa.co.jp | 2000.09.01, 11:40:30 | X-DCS, X-PIX, X-EOP | RX |
| 123456@aaa.co.jp | edward@aaa.co.jp | 2000.09.01, 11:40:55 | X-MCF | TX |
| 123456@aaa.co.jp | edward@aaa.co.jp | 2000.09.01, 11:41:10 | X-DCN | RX |
| 3334444@bbb.com | donald@bbb.com | 2000.09.01, 11:55:00 | X-FAXCALL | RX |
| ... | ... | ... | ... | ... |

FIG. 5

INTERNET FACSIMILE MACHINE, COMMUNICATION METHOD OF INTERNET FACSIMILE MACHINE, RECORDING MEDIUM CAPABLE OF READING BY COMPUTER THE RECORDED COMMUNICATION METHOD OF INTERNET FACSIMILE MACHINE

CROSS REFERENCES TO RELATED APPLICATIONS

This application claims priority of Japanese Patent Application No. 2000-329082, No. 2000-329083 and No. 2000-329084 filed in JPO together on Oct. 27, 2000, the entire disclosures of which are incorporated herein by reference.

BACKGROUND OF THE INVENTION

1. Field of the Invention

The present invention relates to an Internet facsimile machine for transmitting and receiving an image data via the Internet by using an electronic mail.

2. Description of the Related Art

Conventionally, an Internet facsimile communication system applying an Internet facsimile machine for transmitting and receiving an image data via the Internet by using an electronic mail is proposed in the ITU-T recommendation T.37. According to this Internet facsimile machine, an electronic mail including an image data is transmitted under SMTP format to a mail server machine (gateway machine) of the receiving side via a mail server machine (gateway machine) of the transmitting side and the Internet. The Internet facsimile machine of the receiving side accesses to the mail server machine of the receiving side under POP3 format, receives the electronic mail including the image data, and prints out the received image data by using an image recording unit.

The conventional Internet facsimile communication system is constructed as to transmit an image data to the receiving side from the transmitting side unilaterally. Therefore, exchanging of the functions of one another between the transmitting side and the receiving side cannot be carried out. Thus, there are problems such that the received image data cannot be regenerated or the functions cannot be performed fully.

SUMMARY OF THE INVENTION

The object of the present invention is to solve the problems mentioned above and to provide an Internet facsimile machine capable of exchanging the functions of one another between the transmitting side and the receiving side.

The other object of the present invention is to provide an Internet facsimile machine capable of exchanging the functions of one another between the transmitting side and the receiving side, and transmitting an image data under a simplified communication procedure.

It is a still further object of the present invention to provide an Internet facsimile machine capable of exchanging the functions of one another between the transmitting side and the receiving side per one page of image data.

The Internet facsimile machine according to the present invention comprises an exchanging means for exchanging the ability with that of the facsimile machine of the other end by using an electronic mail via the Internet, and a communicating means for transmitting an image data by using an electronic mail based on the exchanged ability of each facsimile machine.

The Internet facsimile machine is characterized in that the electronic mail includes data for identifying a series of facsimile communication.

Moreover, the Internet facsimile machine is characterized in that the exchanging means records the ability of the facsimile machine in the header part of the electronic mail and exchanges with the facsimile machine of the other end. The exchanging means can be characterized for recording the ability of the facsimile machine in the body part of the electronic mail and exchanging with the facsimile machine of the other end.

Furthermore, the Internet facsimile machine is characterized in that the communicating means transmits the image data to the facsimile machine of the other end by including the image data in the body part of the electronic mail. The communicating means can be characterized for transmitting an image data to the facsimile machine of the other end by including the image data in the attached file of the electronic mail.

Moreover, the Internet facsimile machine is characterized in that the image data is TIFF format. The image data can be characterized for being MH format, MMR format, JBIG format or JPEG format.

Furthermore, the Internet facsimile machine further comprises a mail server means for transmitting and receiving the electronic mail via the Internet.

According to the present invention, the Internet facsimile communication system using the electronic mail can transmit an image data after exchanging the ability of one another. As a result, the ability of the Internet facsimile machine of the other end can be preformed fully. Moreover, since the facsimile communication by the electronic mail is being carried out by using the communication procedure signal of the facsimile, whether or not the receiving side has reliably received can be checked by the transmitting side.

Furthermore, the Internet facsimile machine according to the present invention comprises an exchanging means for exchanging the ability with that of the facsimile machine of the other end by using the electronic mail via the Internet, and a communicating means for transmitting an image data of a plural number of pages by using one electronic mail based on the exchanged ability of each facsimile machine.

Moreover, the Internet facsimile machine is characterized in that the communicating means receives the image data transmitted by an electronic mail and carries out a designated receiving process, and transmits to the facsimile machine of the other end, an electronic mail showing the result of the receiving process carried out.

Furthermore, the Internet facsimile machine is characterized in that the communicating means transmits to the facsimile machine of the other end, an electronic mail showing a request for retransmission in the case of presence of inadequacies in part of or all of the image data received in an electronic mail.

Moreover, the Internet facsimile machine is characterized in that the communicating means transmits to the facsimile machine of the other end, an electronic mail showing the fact that receiving cannot be carried out in the case the image data transmitted by an electronic mail cannot be received.

In addition, the Internet facsimile machine comprises a control means for interrupting the facsimile communication in the case the electronic mail of which must be responded cannot be received within a prescribed period of time after the transmission of the electronic mail by the communicating means.

According to the present invention, the Internet facsimile communication system using an electronic is capable of transmitting an image data under the simplified communication procedure, such as transmitting an image data of one page or a plural number of pages by one electronic mail after exchanging the functions between one another. Accordingly, the ability of the Internet facsimile machine of the other end can be performed fully. Moreover, since the facsimile communication by the electronic mail is carried out by using the communication procedure signal of the facsimile, the transmitting side can reliably confirm whether or not the receiving side has received.

The Internet facsimile machine according to the present invention comprises an exchanging means for exchanging the ability with that of the facsimile machine of the other end by using an electronic mail per one page of image data via the Internet, and a communicating means for transmitting an image data in reference to the exchanged ability of each facsimile machine.

Moreover, the Internet facsimile machine is characterized in that when transmitting one page of image data, the exchanging means and the communicating means transmit by one electronic mail, a transmitting subscriber identification signal and a digital command signal along with the one page of the image data.

Furthermore, the Internet facsimile machine is characterized in that when transmitting an image data of a plural number of pages, the exchanging means and the communicating means transmit the transmitting subscriber identification signal and the digital command signal along with the image data of the first page in one electronic mail, and then transmit the digital command signal along with the image data of the second page onwards in one electronic mail.

In addition, the Internet facsimile machine is characterized in that the communicating means retransmits the image data of the previous page in the case the ability of the facsimile machine cannot be exchanged with that of the other end concerning the image data of the next page even after the prescribed period of time has elapsed from the transmission of the previous image data.

According to the present invention, the Internet facsimile communication system using the electronic mail is capable of transmitting the image data after exchanging the ability of one another per one page of image data. As a result, the ability of the Internet facsimile machine of the other end can be fully performed. Moreover, since the facsimile communication by an electronic mail is being carried out according to the communication procedure signal of the facsimile, the transmitting side can reliably confirm whether or not the receiving side has received.

BRIEF DESCRIPTION OF THE DRAWINGS

FIG. 3 is a diagram showing an example of the FAXID management table 8a stored in the compact flash 8 shown in FIG. 1.

FIG. 4 is a diagram showing an example of the communication record transmission table 8b stored in the compact flash 8 shown in FIG. 1.

FIG. 5 is a diagram showing an example of the communication record receiving table 8c stored in the compact flash 8 shown in FIG. 1.

DETAILED DESCRIPTION OF THE INVENTION

The embodiments according to the present invention will now be described in reference to the accompanying drawings.

FIRST EMBODIMENT

Figure 1:
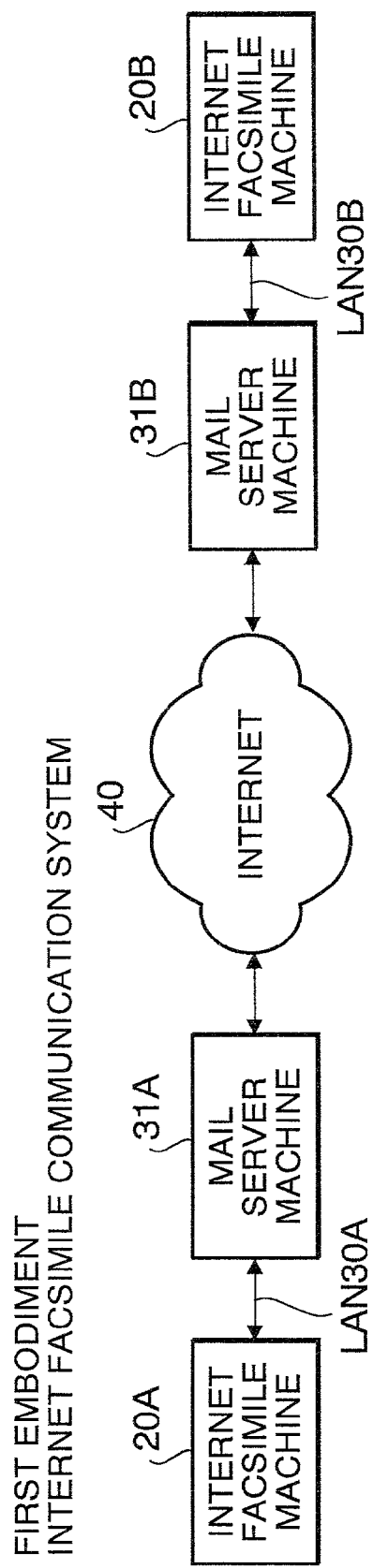
FIG. 1 is a block diagram showing the formation of the Internet facsimile communication system according to the first embodiment of the present invention.
Figure 2:
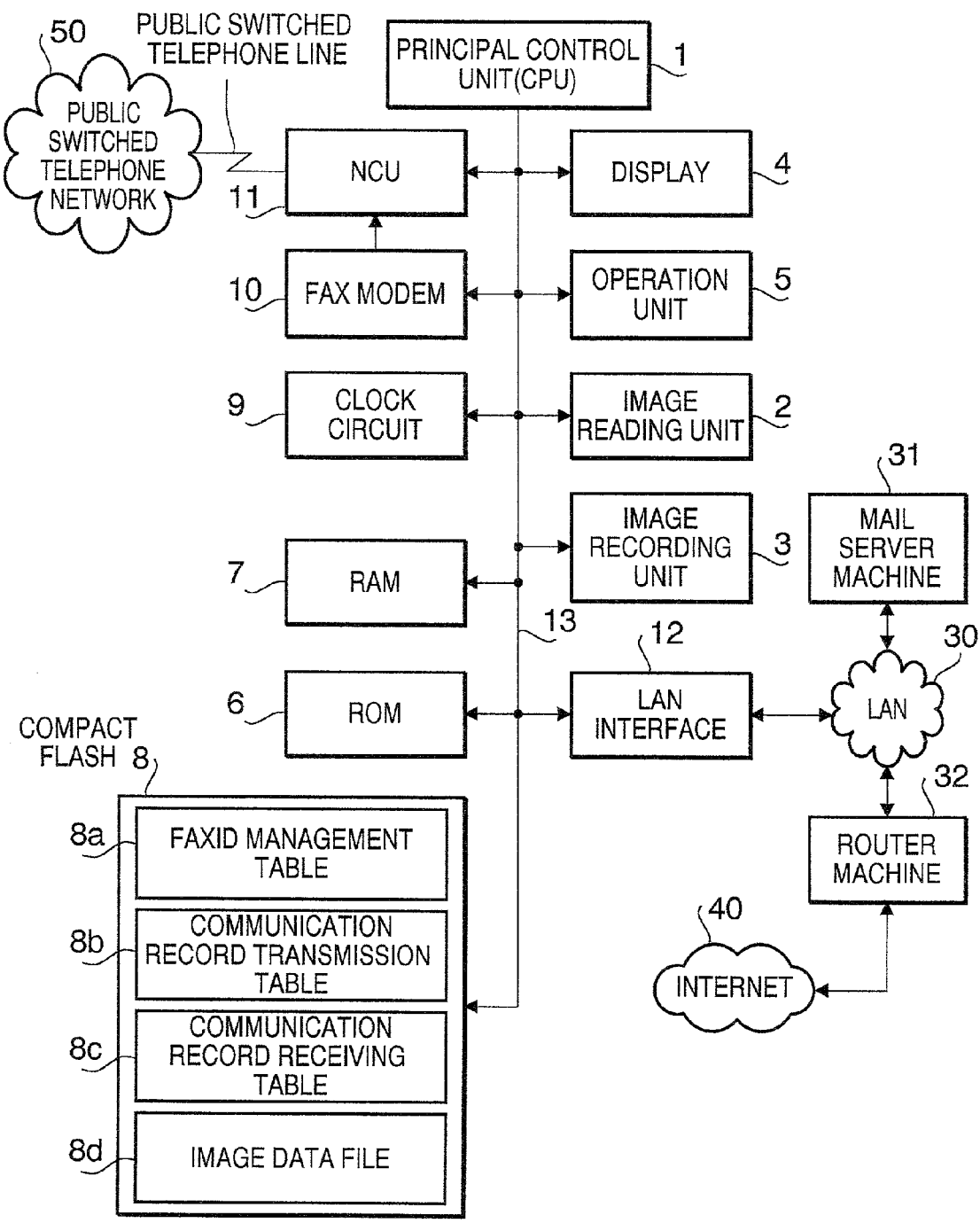
FIG. 2 is a block diagram showing a detailed formation of the Internet facsimile machine 20 shown in FIG. 1.

FIG. 1 is a block diagram showing the formation of the Internet facsimile communication system according to the first embodiment of the present invention. FIG. 2 is a block diagram showing a detailed formation of the Internet facsimile machine 20 shown in FIG. 1.

The Internet facsimile communication system according to the first embodiment carries out facsimile communication by using an Internet facsimile machine for transmitting and receiving an image data by using an electronic mail via the Internet, and by adopting SMTP (Simple Mail Transfer Protocol) and POP3 (Post Office Protocol 3) which are the protocols of the electronic mail. In other words, as shown in FIG. 1, the Internet facsimile machine 20A of the transmitting side transmits an electronic mail including an image data to the mail server machine (gateway machine) 31B of the receiving side via the mail server machine (gateway machine) 31A of the transmitting side and the Internet 40 using SMTP. Then, the Internet facsimile machine 20B of the receiving side, periodically under a designated period of such as 30 seconds, accesses to the mail server machine 31B of the receiving side using POP3, receives the electronic mail including an image data, and prints out the received image data by using an image recording unit 3. As shown in FIG. 2, the Internet facsimile machine 20A and the Internet facsimile machine 20B have the functions of the transmitting side and the receiving side, generically have the code number 20. The mail server machine 31A and the mail server machine 31B for transmitting and receiving the electronic mail via the Internet 40 have the functions of the transmitting side and the receiving side, generically have the code number 31.

The Internet facsimile machine 20 according to the first embodiment is an Internet facsimile machine 20 for carrying out a facsimile communication by using the electronic mail via the Internet. A principal control unit 1 is characterized in that it exchanges the ability with that of the facsimile machine of the other end by the electronic mail according to the communication procedure same as the communication procedure of ITU-T Recommendation T-30 used in the facsimile communication, and transmits the image data according to the exchanged ability of each facsimile machine. The electronic mail mentioned here includes FAXTD (facsimile communication identifying number) which is the data for identifying the series of facsimile communication. Moreover, the principal control unit 1 records the ability of the facsimile machine in the header part (or can be in the body part) of the electronic mail and exchanges with the facsimile machine of the other end. Furthermore, the principal control unit 1 adds the image data to the body part (or can be the attached file) of the electronic mail and transmits the image data to the facsimile machine of the other end. The image data is preferable to be TIFF (Tagged Image File Format) format, or MH (Modified Huffman) format, MMR (Modified Modified Read) format, JBIG (Joint Bi-level Image experts Group) format or JPEG (Joint Photographic Experts Group) format.

Referring to FIG. 1, the facsimile machine 20 comprises a facsimile communication function of the conventional G3 method or the like along with a facsimile communication function using the electronic mail. Specifically, the principal control unit 1 is formed of CPU (Central Processing Unit), connected to the following hard wear parts via a bus 13, controls these and carries out the function of various kinds of soft ware to be mentioned later on. An image reading unit 2 reads the documents by the scanner utilizing CCD (Charge Coupled Device) or the like, and outputs the dotted image data converted into the binary of white and black. An image recording unit 3 is a printing machine of electro-photographic typed or the like, prints out and records as a hard copy the image data received by the facsimile communication from the other facsimile machine. A display 4 is a displaying apparatus such as a liquid crystal display (LCD) or a CRT (Cathode-Ray Tube) display, and displays the operational status of the facsimile machine 20 or displays the image data of the documents to be transmitted or the received image data.

An operation unit 5 comprises letter keys necessary for operating the facsimile machine 20, such as a ten-key for dialing, a speed-dialing key, a one-touch dial key, and various kinds of function keys. Further, by making the display 4 to be a touch panel typed, a part of or all of the various keys of the operation unit 5 can be constructed to be shared.

ROM (Read Only Memory) 6 stores beforehand the programs of various soft wear to be carried out by the principal control unit 1 which are necessary for the operation of the facsimile machine 20. Moreover, these programs are recorded in the recording medium of such as a floppy disk, MO (Magneto Optical Disk), DVD-RAM (Digital Versatile Disk-RAM), and can be executed by loading to RAM (Random Access Memory) 7 via the drive apparatus as the need arises. RAM 7 is formed by SRAM (Static RAM), used as the working area of the principal control unit 1 and records the temporary data generating during the execution of the program. A compact flash 8 serves as the so-called image memory and a memory as a program recording medium and comprises a FAXID management table 8a, a communication record transmission table 8b, a communication record receiving table 8c, and an image data file 8d storing the image data per transmission job or receiving job. Moreover, a clock circuit 9 clocks the present time and outputs the data of the present time to the principal control unit 1 as the need arises.

A faxmodem 10 is connected to a public switched telephone network 50 via a public switched telephone line L, includes a function of a faxmodem for the normal facsimile communication, demodulates the data of the transmitting telephone number information received as FSK (Frequency Shift Keying) signal and outputs the data to the principal control unit 1. NCU (Network Control Unit) 11 is a hard wear circuit carrying out operations of closing and releasing the direct current loop or the like of an analog public switched telephone line L and including automatic dial function, and connects the faxmodem 10 to the public switched telephone line L as the need arises. NCU 11 detects ID receiving terminal starting signal of the transmitting telephone number reporting service and the normal telephone ringing signal, and is capable of transmitting the first response signal and the second response signal of the transmitting telephone number reporting service as the need arises. Further, NCU 11 can be connected to the digital network (for example, ISDN network) of a base band transmitting form via a designated terminal adapter and DSU (Digital Service Unit).

LAN interface 12 is an interface circuit for carrying out the signal exchanging or the protocol exchanging of the signals and the data, to connect the facsimile machine 20 to a local area network 30 such as Ethernet. A mail server machine 31 and a router machine 32 are connected to the LAN (Local Area Network) 30. Furthermore, the router machine 32 is connected to the mail server machine (not shown in the drawings) of the other end via the Internet 40. When transmitting a mail with an image data attached to the mail body part for example from the facsimile machine 20, the mail is transmitted to the mail server machine 31 from the LAN interface 12 via the LAN 30, and then the mail server machine 31 transmits the Internet mail as a packet to the facsimile machine of the other end via the LAN 30, the router machine 32, the Internet 40 and the mail server machine of the other end (not shown in the drawings). On the other hand, when receiving an electronic mail as a packet, the mail is received in the back order of the procedure mentioned above. Further, the circuit connection to the Internet 40 is not to be limited to a leased line or the like, but can be a dial up connection employing the public switched telephone line L.

The facsimile machine 20 according to the embodiment constructed as described above, includes a facsimile communication function using electronic malls, in addition to the normal facsimile communication function of G3 format or the like. In the normal facsimile communication function of G3 format or the like, the dotted image data read by the image reading unit 2 is encoded by the soft wear in reference to the encoding method, such as MU, MR (Modified Read), and MMR which are determined in the facsimile communication standards, and is transmitted to the facsimile machine of the other end, while the encoded data received from the facsimile machine of the other end is decoded into an image data by the soft wear and output as a hard copy from the image recording unit 3. Further, the facsimile communication function using the electronic malls will be described later on in detail.

FIG. 3 is a diagram showing an example of a FAXID management table 8a, stored in the compact flash 8 shown in FIG. 1. According to the embodiment, the FAXID is a serial number showing a series of one facsimile communication, however, transmits as a X-FAXID signal with "@" and the own domain added to the end of the FAXID. As shown in FIG. 3, the selecting of numbers for the FAXID (selecting a new number) and its management are carried out by using the FAXID management table 8a. In the FAXID management table 8a, the mail address of the other end, the start time and the finish time of the facsimile communication are stored by each X-FAXID. Further, in the case the finish time is shown with "-", the facsimile communication is yet to be finished.

FIG. 4 is a diagram showing an example of the communication record transmission table 8b stored in the compact flash 8 shown in FIG. 1. As shown in FIG. 4, in the communication record transmission table 8b, X-FAXID, the mail address of the other end, the communication time, the types of the signal, the distinction between TX (transmission) or RX (receiving) are stored corresponding to each signal for each transmission and receiving of each signal using the procedure signal same as ITU-T Recommendation T.30 when carrying out a facsimile transmission to the facsimile machine of the other end from own facsimile machine.

FIG. 5 is a diagram showing an example of a communication record receiving table 8c stored in the compact flash 8 shown in FIG. 1. As shown in FIG. 5, in the communication record receiving table 8c, X-FAXID, the mail address of the other end, the communication time, the types of the signal, the distinction between TX (transmission) or RX (receiving) are stored corresponding to each signal for each transmission and receiving of each signal using the procedure signal same as ITU-T Recommendation T.30 when a facsimile is transmitted to own facsimile machine from that of the other end.

According to the first embodiment, the signals of X- (the name of the procedure signal of T30 communication procedure of the facsimile communication) formed are stored in the expanded header part of the electronic mail. Specifically, a header part showing the facsimile signals such as X-DIS, X-DCS, X-EOM (End of Message signal), and the calling signal (in the embodiment, the facsimile transmission notification signal) is used, and the T30 communication procedure of the facsimile communication is carried out on electronic mail basis by exchanging the electronic mails using such header parts. For example, X-FAXCALL is used for the header part showing the facsimile transmission notification signal. Moreover, the header parts requiring the data content of such as DIS signal or DCS signal can be recorded in the header part like X-DIS-205680443586, or can be recorded as a new header part, or in the body part. Furthermore, since there is no meaning for using TCF (Training Check) signal in the T30 communication procedure, the signal cannot be used.

Moreover, after the image data is encoded by TIFF format, or MH format, MMR format, JBIG format or JPEG format, the image data is converted in MIME (Multipurpose Internet Mail Extensions) and transmitted as the body part or an attached file. Further, when the image data is recorded in TIFF format, the information of the image data is recorded in the header part of TIFF format, thus the information corresponding to DCS signal is not required to be transmitted separately. Furthermore, to show the image data, X-PIX or the like is added in the header part. The image data is transmitted as one electronic mail per each page. Furthermore, in the case the exchanging of the electronic mails is interrupted, the facsimile machine 20 of the transmitting side tries to retransmit from the next page of the page already transmitted after a prescribed period of time, or all of the pages can be retransmitted.

Moreover, for the transmitting side and the receiving side to recognize that the electronic mail is the mail for the facsimile communication and the communication is uniquely being carried out currently, as in the manner stated above, when the transmitting side transmits a calling electronic mail, or when the receiving side transmits an electronic mail responding to the calling, the FAXID which is the communication management information, is to be added to the header part of the mail, and until the facsimile procedure completes, the communication management information is added to the header part and the mails are exchanged between one another. By using the FAXID, the transmitting side and the receiving side can carry out the facsimile communication of many-to-many at the same time.

An example of each header part of X-FAXCALL signal (facsimile transmission notification signal), X-CSI (Called Subscriber Identification) signal, X-TSI (Transmitting Subscriber Identification) signal, X-CFR (Confirmation to Receive) signal are shown in the tables below:

TABLE I

Message-ID: <37D50932.97EF2823@abc.co.jp>
Date: Tue, 07 Sep 1999 21:46:42 +0900
From: ifax@abc.co.jp
To: faxterminal@xyz.co.jp
Subject: Internet FAX
X-FAXCALL: Call for IFAX
X-FAXID: 00001@abc.co.jp
MIME-Version: 1.0

TABLE II

Message-ID: <47D50932.87EF2823@xyz.co.jp>
Date: Tue, 07 Sep 1999 21:47:42 +0900
From: faxterminal@xyz.co.jp

TABLE II-continued

To: ifax@abc.co.jp
Subject: Internet FAX
X-FAXID: 00001@abc.co.jp
X-CSI: 075-111-1234
X-DIS: 0020EEF8C4809580808020
MIME-Version: 1.0

TABLE III

Message-ID: <57D50932.97EF2823@abc.co.jp>
Date: Tue, 07 Sep 1999 21:48:30 +0900
From: ifax@abc.co.jp
To: faxterminal@xyz.co.jp
Subject: Internet FAX
X-FAXID: 00001@abc.co.jp
X-TSI: 075-111-2345
X-DCS: 830022F8C48004
MIME-Version: 1.0

TABLE IV

Message-ID: <48D50932.87EF2823@xyz.co.jp>
Date: Tue, 07 Sep 1999 21:48:52 +0900
From: faxterminal@xyz.co.jp
To: ifax@abc.co.jp
Subject: Internet FAX
X-FAXID: 00001@abc.co.jp
X-CFR: 84
MIME-Version: 1.0

Furthermore, one of the examples of the communication procedure of the facsimile communication according to the first embodiment will be described in the following in reference to FIG. 6.

Figure 6:
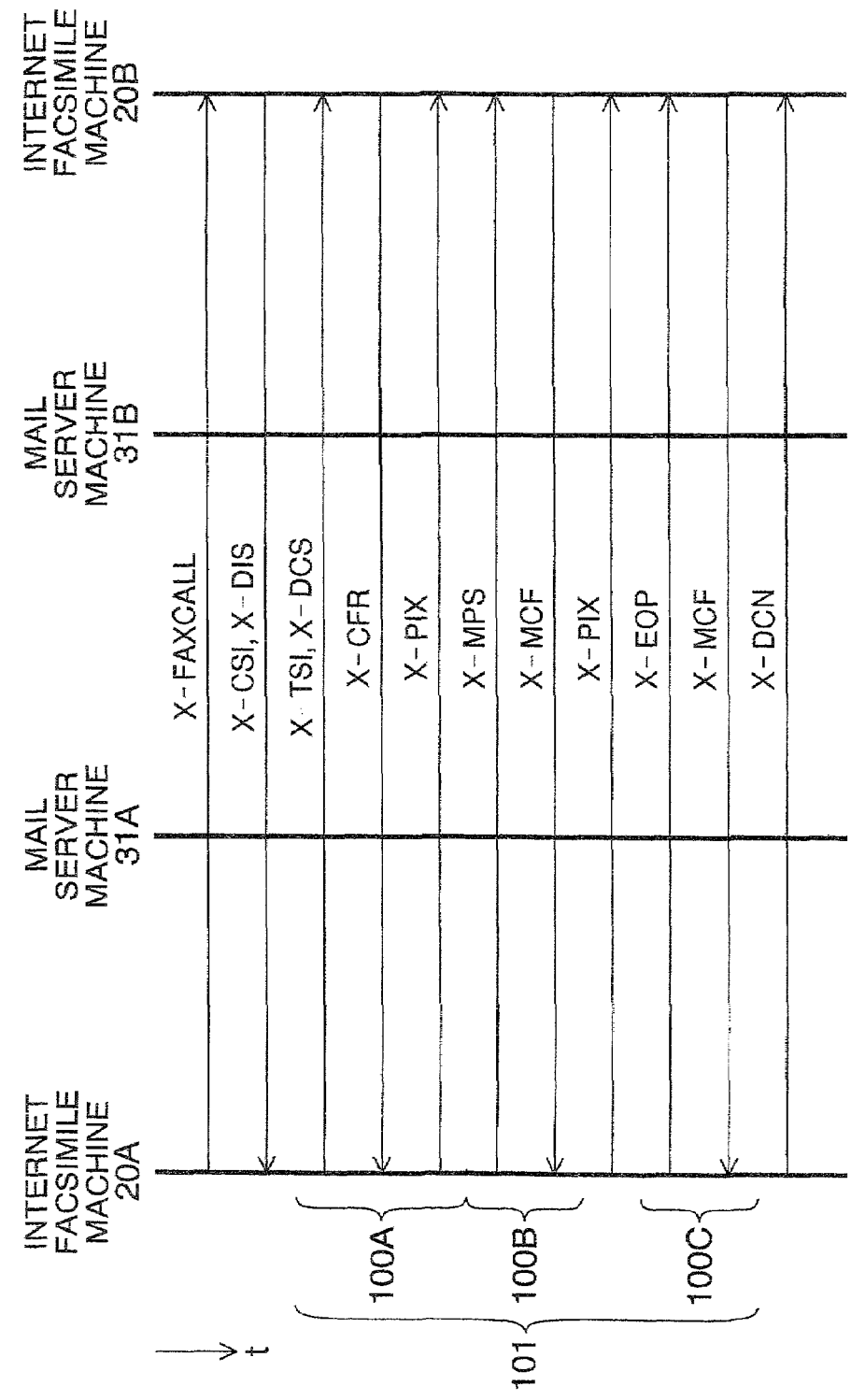
FIG. 6 is a sequence diagram showing the communication procedure of the facsimile communication according to the first embodiment of the present invention.

Referring to FIG. 6, first, the Internet facsimile machine 20A transmits an electronic mail of X-FAXCALL signal to the Internet facsimile machine 20B via the mail server machine 31A and the mail server machine 31B. When receiving the X-FAXCALL signal, the Internet facsimile machine 20B transmits an electronic mail of X-CSI signal and X-DIS signal (digital identification signal showing the receiving function or the receiving ability of the called terminal) to the Internet facsimile machine 20A. Next, the Internet facsimile machine 20A transmits an electronic mail of X-TSI signal and X-DCS signal (digital command signal showing the function order [transmission function or the transmission ability] from the transmission terminal) to the Internet facsimile machine 20B. Responding to this, the Internet facsimile machine 20B transmits an electronic mail of X-CFR signal (confirmation to receive signal) to the Internet facsimile machine 20A.

The Internet facsimile machine 20A transmits an electronic mail of X-PIX including the image data of the first page to the Internet facsimile machine 20B, and then the electronic mail of X-MPS signal (multi-page signal showing the presence of the image data of the next page). Responding to this, the Internet facsimile machine 20B transmits an electronic mail of X-MCF signal (message confirmation signal showing the fact that the message has been received completely by affirmative response to X-MPS signal) to the Internet facsimile machine 20A. Furthermore, the Internet facsimile machine 20A transmits an electronic mail of X-PIX signal including the image data of the second page to the Internet facsimile machine 20B, and then X-EOP signal (end of procedure signal showing the end of the transmission of the image data). Accompanying this, the Internet facsimile machine 20B responds by transmitting X-MCF signal (message confirmation signal showing the fact that the message has been received completely by affirmative response to X-EOP signal) to the Internet facsimile machine 20A. Furthermore, the Internet facsimile machine 20A transmits X-DCN signal (disconnect signal) to the Internet facsimile machine 20B and the series of the facsimile communication is completed.

In the communication procedure shown in FIG. 6, the process 100B showing the presence of the image data of the next page is carried out following the transmission process 100A of the image data of the first page, and the transmission process 100C of the image data of the second page is carried out accordingly. The transmission process 101 for transmitting the image data of two pages is carried out herewith.

As in the manner stated above, according to the first embodiment, in the Internet facsimile communication system using the electronic mail, the image data can be transmitted after exchanging the ability of one another. As a result, the ability of the Internet facsimile machine of the other end can be fully performed. Moreover, since the facsimile communication by the electronic mail is carried out by using the communication procedure signal of the facsimile, the transmitting side can reliably confirm whether or not the receiving side has received.

SECOND EMBODIMENT

Figure 7:
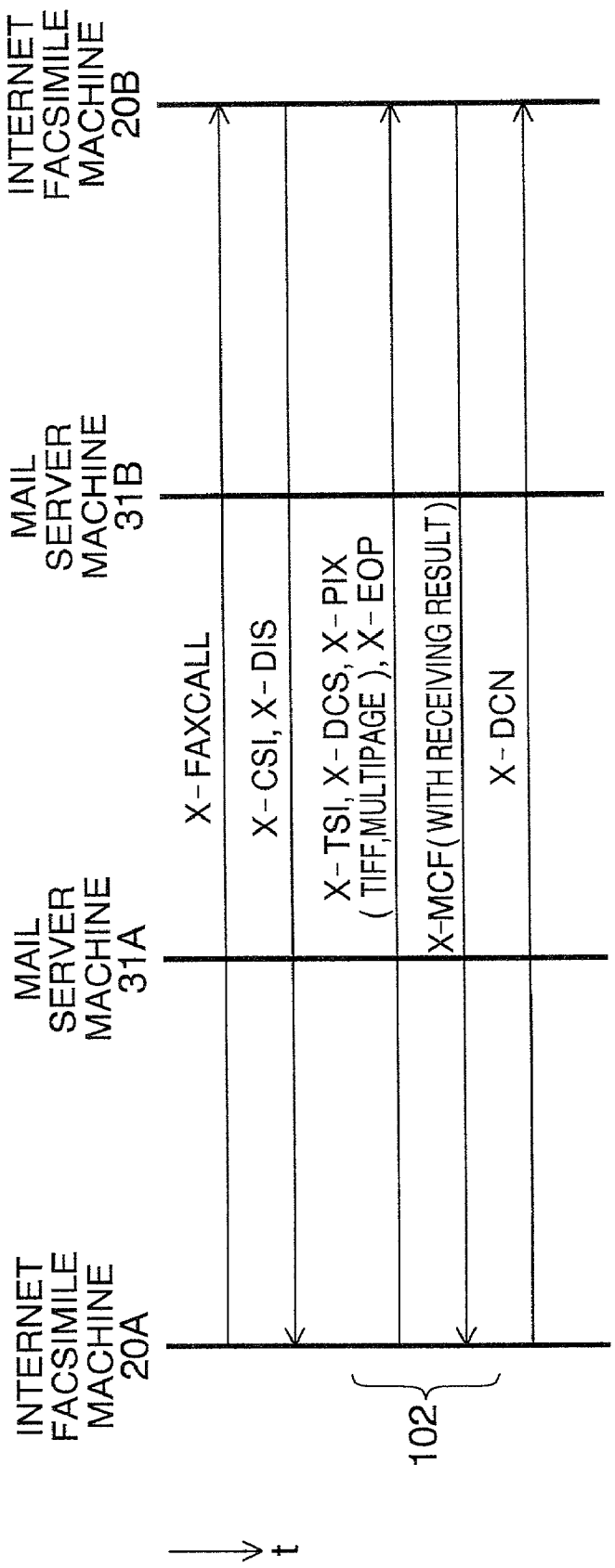
FIG. 7 is a sequence diagram showing the communication procedure of the facsimile communication according to the second embodiment of the present invention.
Figure 8:
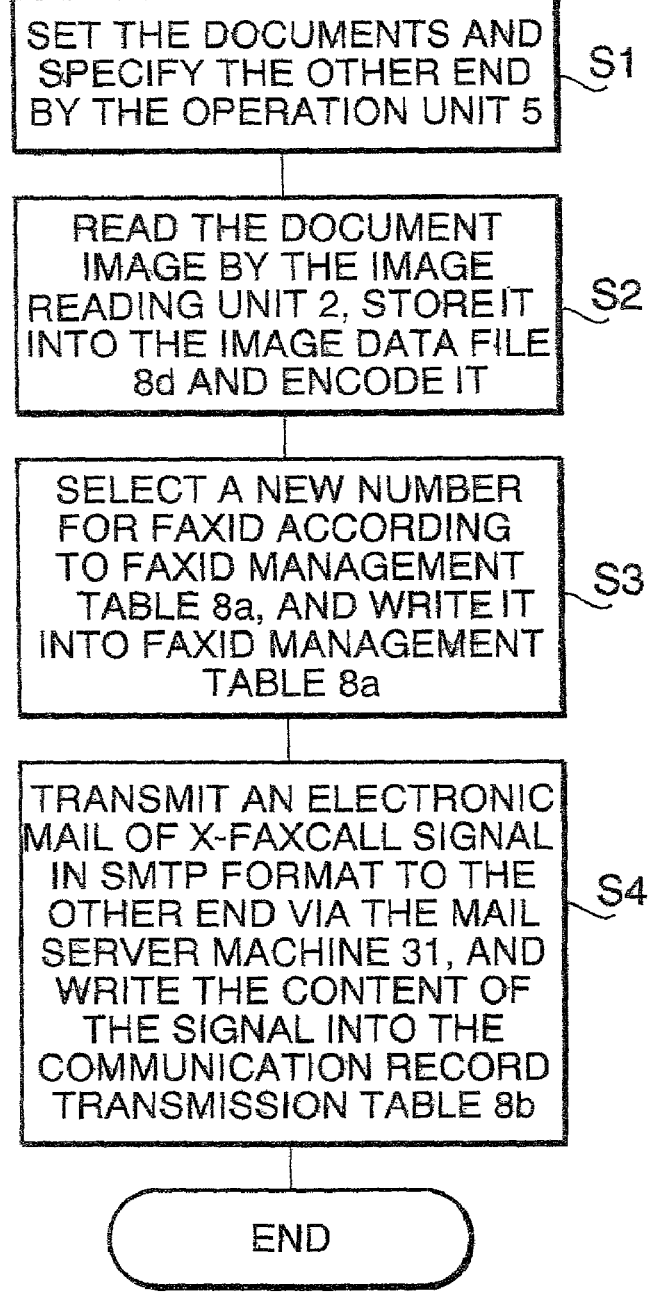
FIG. 8 is a flow chart showing the transmission process to be carried out by the Internet facsimile machine 20 according to the second embodiment of the present invention.
Figure 9:
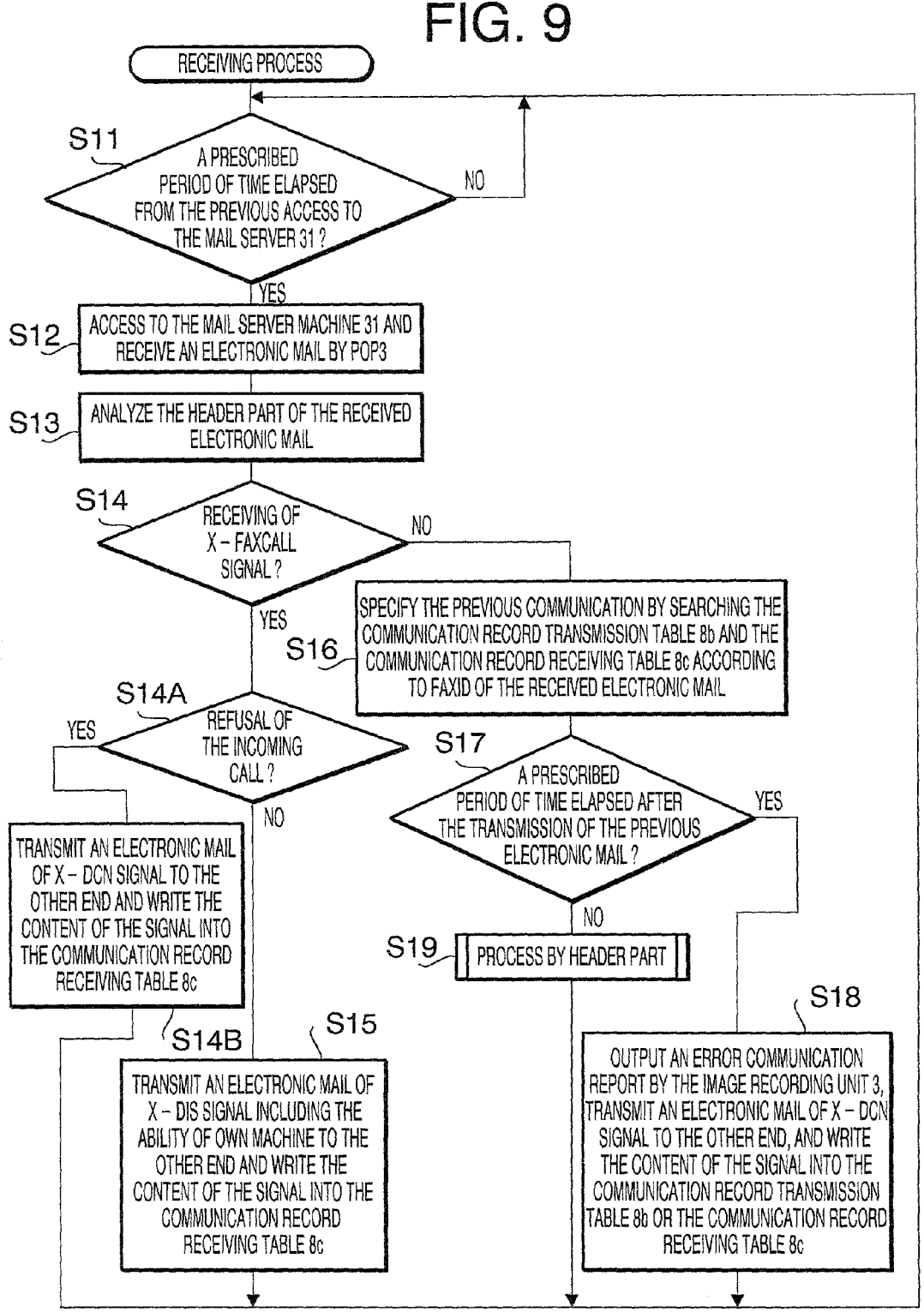
FIG. 9 is a flow chart showing the receiving process to be carried out by the Internet facsimile machine 20 according to the second embodiment of the present invention.
Figure 10:
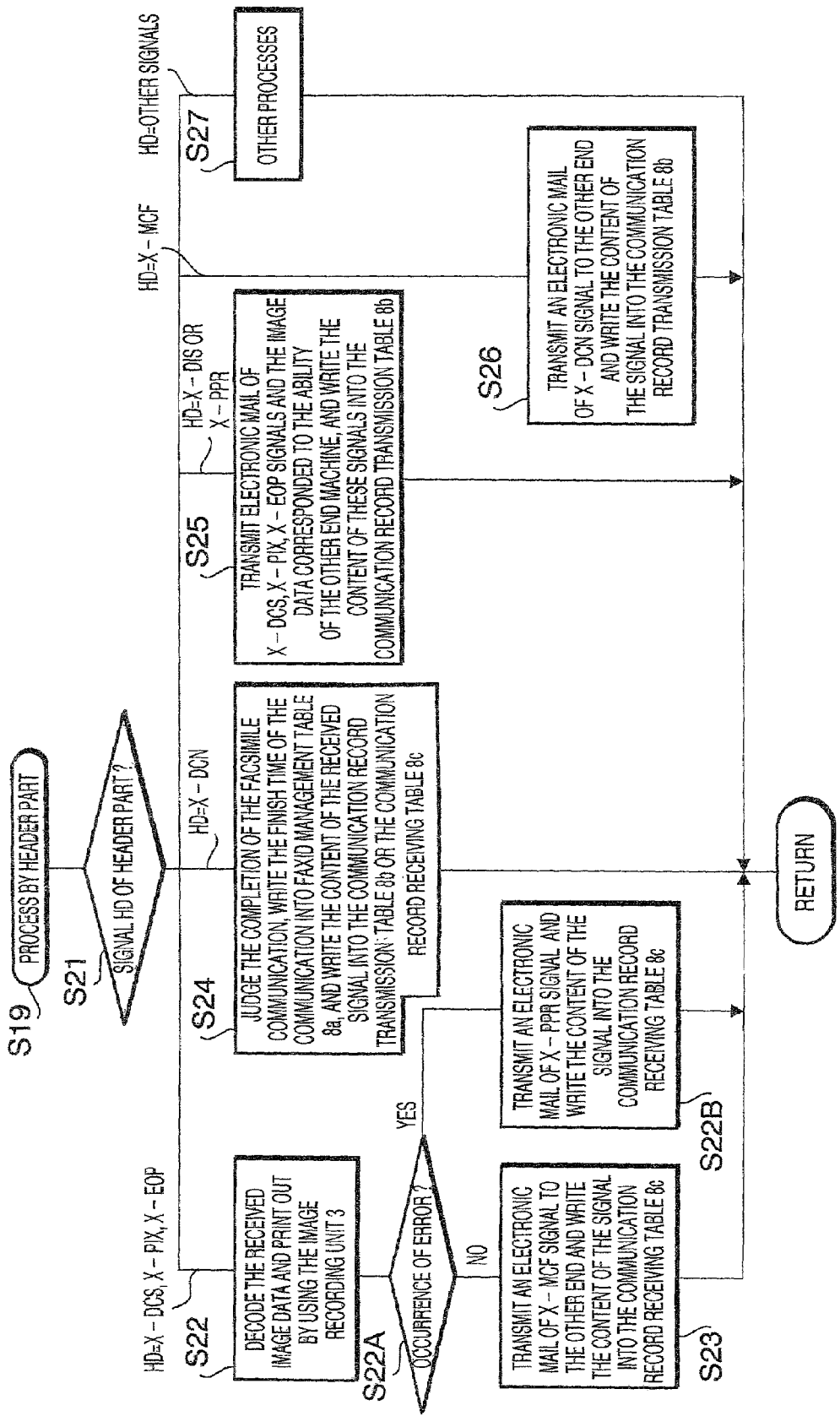
FIG. 10 is a flow chart showing the process by header part (step S19) which is a subroutine of FIG. 9.
Figure 11:
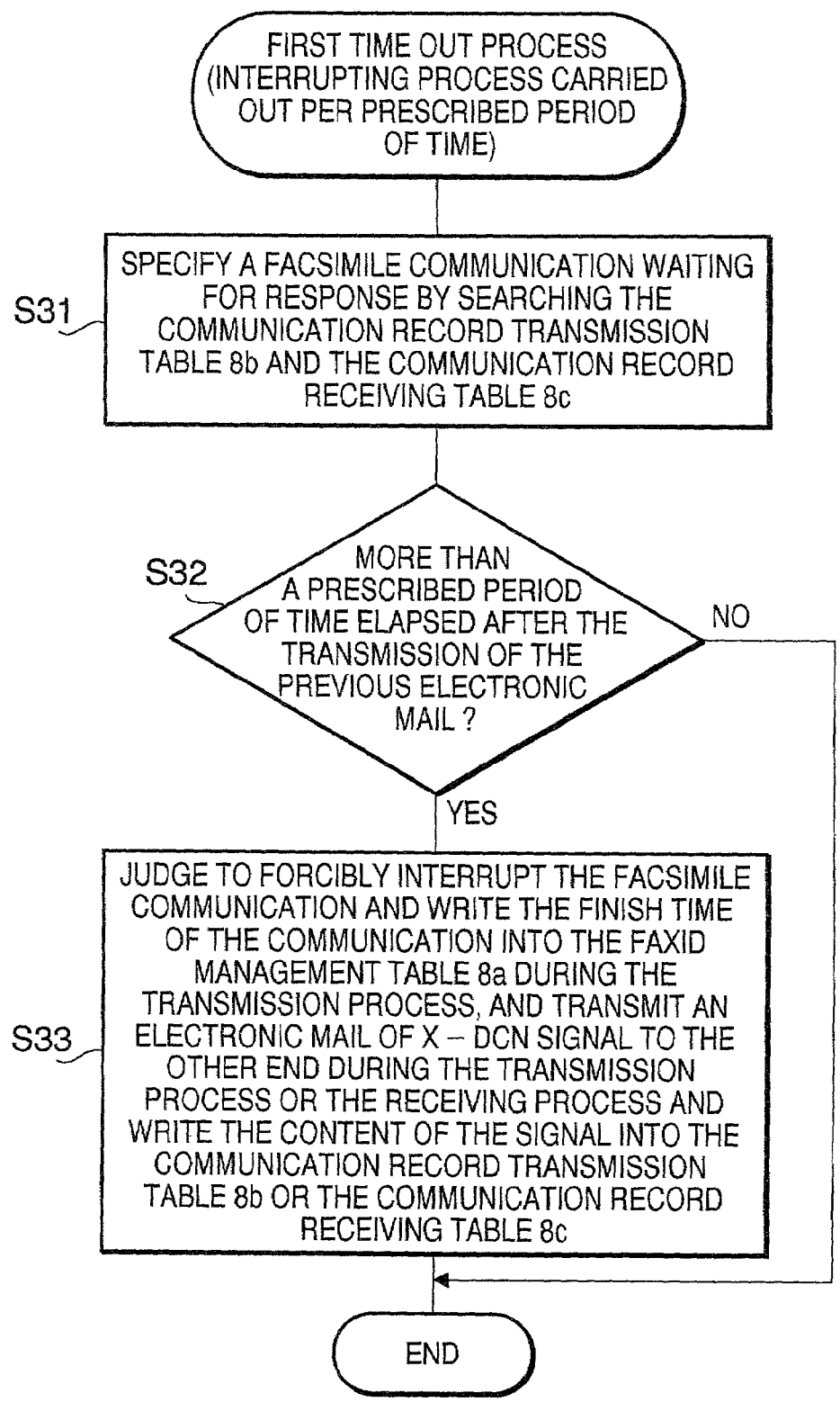
FIG. 11 is a flow chart showing the first time out process which is an interrupting process carried out per prescribed period of time by the Internet facsimile machine 20 according to the second embodiment of the present invention.

FIG. 7 is a sequence diagram showing the communication procedure of the facsimile communication according to the second embodiment of the present invention. FIG. 8 is a flow chart showing the transmission process to be carried out by the Internet facsimile machine 20 according to the second embodiment of the present invention. Moreover, FIG. 9 is a flow chart showing the receiving process to be carried out by the Internet facsimile machine 20 according to the second embodiment of the present invention. FIG. 10 is a flow chart showing the process by header part (Step S19) which is a subroutine of FIG. 9. Furthermore, FIG. 11 is a flow chart showing the first time out process which is an interrupting process carried out per prescribed period of time by the Internet facsimile machine 20 according to the second embodiment of the present invention.

The Internet facsimile machine 20 according to the second embodiment has the same structure as the structure illustrated in FIG. 2. As shown in FIG. 7, the principal control unit 1 exchanges the ability of the facsimile machine with that of the other end by using the electronic mail, and transmits the image data of a plural number of pages in one electronic mail according to the exchanged ability of each facsimile machine. Moreover, the principal control unit 1 receives the image data transmitted in an electronic mail, and carries out the designated receiving processes shown in FIG. 9 and FIG. 10. Specifically, the principal control unit 1 decodes the received image data, prints on a recording paper by using the image recording unit 3 (step S22 in FIG. 10), and transmits to the facsimile machine of the other end (step S23), an electronic mail of X-MCF signal (message confirmation signal) showing the result of the receiving process (the fact that the image data has been reliably received and decoded) carried out as above-described in the case of no error has occurred ("NO" in step S22A). On the other hand, in the case an error is occurred during decoding and there is inadequacy in part of or all of the received image data ("YES" in step S22A), an electronic mail of X-PPR (Partial Page Request) signal showing the retransmission demand is transmitted to the facsimile machine of the other end (step S22B).

Furthermore, when receiving an image data transmitted by an electronic mail, in other words, when receiving X-FAXCALL signal ("YES" in step S14 in FIG. 9), the principal control unit 1 transmits to the facsimile machine of the other end, an electronic mail of X-DCN signal (disconnect signal) showing the failure of the receiving, in the case of refusing an incoming call ("YES" in step S14A) for failing to receive an image data due to the troubles inside the Internet facsimile machine 20 such as the image recording unit 3. Moreover, when an electronic mail is transmitted by the transmission process shown in FIG. 8 or the receiving process shown in FIG. 9 and FIG. 10, in the case an electronic mail, which must respond to the firstly transmitted mail, cannot be received within a prescribed period of time after the transmission ("YES" in step S32 of the first time out process shown in FIG. 11), the facsimile communication is suspended (step S33).

Next, the communication procedure of the facsimile communication according to the second embodiment will be described in reference to FIG. 7.

Referring to FIG. 7, the Internet facsimile machine 20A transmits X-FAXCALL signal to the Internet facsimile machine 20B via the mail server machine 31A and the mail server machine 31B. When receiving the X-FAXCALL signal, the Internet facsimile machine 20B transmits X-CSI and X-DIS signals to the Internet facsimile machine 20A. Next, the Internet facsimile machine 20A transmits the X-TSI, X-DCS, an image data of X-PIX signal (including the image data of all pages in TIFF format and multi-page format), and X-EOP signal. Responding to this, the Internet facsimile machine 20B transmits X-MCF signal (with receiving result) to the Internet facsimile machine 20A. X-MCF signal is a message confirmation signal and an affirmative response to the previous X-EOP signal to show that the message has been received completely. In other words, the result of the receiving process carried out (the fact that the image data has been reliably received and decoded) is shown. Furthermore, responding to X-MCF signal, the Internet facsimile machine 20A transmits X-DCN signal to the Internet facsimile machine 20B.

In the communication procedure according to the second embodiment shown in FIG. 7, the image data including a plural number of pages is transmitted by one electronic mail (procedure of 102 shown in FIG. 7). As a result, comparing to the case in which transmitting one electronic mail per one page of image data as in the first embodiment shown in FIG. 6 (procedure of 101 shown in FIG. 6), the communication procedure can greatly be simplified.

FIG. 8 is a flow chart showing the transmission process carried out by the Internet facsimile machine 20 according to the second embodiment. Referring to FIG. 8, the documents are set in step S1, and the destination is specified by the operation unit 5. Next, in step S2, the document image is read by the image reading unit 2, stored in the image data file 8d and encoded. Then in step S3, a new number is selected for the FAXID according to the FAXID management table 8a, and written into the FAXID management table 8a. Then in step S4, an electronic mail of X-FAXCALL signal is transmitted in SMTP to the destination via the mail server machine 31, the content of the signal is written into the communication record transmission table 8b and the transmission process is terminated.

FIG. 9 is a flow chart showing the receiving process to be carried out by the Internet facsimile machine 20 according to the second embodiment.

Referring to FIG. 9, in step S11, it is judged whether or not a prescribed period of time has elapsed after the previous access to the mail server machine 31, the process of step S11 is repeated until "YES" is selected. When "YES" is selected in step S11, the electronic mail is downloaded and received in POP3 by accessing to the mail server machine 31 in step S12. Next, in step S13, the header part of the received electronic mail is analyzed. In step S14, it is judged whether or not an electronic mail of X-FAXCALL signal has been received. When "YES" is selected, it proceeds to steps S14A. On the other hand, when "NO" is selected, it proceeds to step S16. In step S14A, it is judged whether or not to refuse an incoming call as a result of the failure of receiving the image data due to the troubles inside the Internet facsimile machine 20 such as the image recording unit 3, the direct mails or SPAM mails. When "YES" is selected, in step S14B, an electronic mail of X-DCN signal (disconnect signal) is transmitted to the other end, and the content of the signal is written into the communication record receiving table 8c and it returns to step S11. On the other hand, when "NO" is selected in step S14A, in step S15, an electronic mail of X-DIS signal including the ability of the own machine is transmitted to the other end, and the content of the signal is written into the communication record receiving table 8c and it returns to step S11.

In step S16, by searching the communication record transmission table 8b and the communication record receiving table 8c according to the FAXID of the received electronic mail, the previous communication is specified, and in step S17, it is judged whether or not a prescribed period of time has elapsed after the transmission of the previous electronic mail. When "NO" is selected, it proceeds to step S19 and returns to step S11 after the process by header part which is the subroutine of FIG. 10 is carried out. On the other hand, when "YES" is selected in step S17, in step S18, an error notification report is output by the image recording unit 3, an electronic mail of X-DCN signal (disconnect signal) is transmitted to the other end, the content of the signal is written into the communication record transmission table 8b and it returns to step S11.

FIG. 10 is a flow chart showing the process by header part (step S19) which is the subroutine of FIG. 9. Referring to FIG. 10, in step S21, it is judged what the signal HD of the header part of the received electronic mail is, and it branches as follows according to the signal HD of the header part:
(a) Proceed to step S22 when HD=X-DCS, X-PIX, X-EOP.
(b) Proceed to step S24 when HD=X-DCN.
(c) Proceed to step S25 when HD=X-DIS or X-PPR.
(d) Proceed to step S26 when HD=X-MCF.
(e) When HD=other signals, designated other processes are carried out according to the signal in step S27 and return to the original main routine In step S22, the received image data is decoded and printed out by the image recording unit 3. In step S22A, it is judged whether or not an error has occurred in processes such as the decoding process or the recording process. When "YES" is selected, it proceeds to step S22B, an electronic mail of X-PPR signal is transmitted for demanding retransmission, the content of the signal is written into the communication record receiving table 8c and it returns to the original main routine. On the other hand, when "NO" is selected in step S22A, in step S23, an electronic mail of X-MCF signal (message confirmation signal) is transmitted to the other end, the content of the signal is written into the communication record receiving table 8c and its returns to the original main routine. Moreover, in step S24, it is judged that the facsimile communication has been completed, the finish time of the communication is written into the FAXID management table 8a, the content of the received signal is written into the communication record transmission table 8b or the communication record receiving table 8c, and it returns to the original main routine. In step S25, an electronic mail of X-DCS, X-PIX, X-EOP signals and the image data corresponded to the ability of the other end machine are transmitted to the other end, and the content of these signals are written into the communication record transmission table 8b. In step S26, an electronic mail of X-DCN signal (disconnect signal) is transmitted to the other end, the content of the signal is written into the communication record transmission table 8b and it returns to the original main routine.

FIG. 11 is a flow chart showing the first time out process which is an interrupting process carried out per a prescribed period of time (for example, 5 minutes) by the Internet facsimile machine 20 according to the second embodiment.

Referring to FIG. 11, in step S31, by searching the communication record transmission table 8b and the communication record receiving table 8c, a facsimile communication waiting for a response is specified. In step S32, it is judged whether or not more than a prescribed period of time has elapsed after the transmission of the previous electronic mail. When "YES" is selected, it proceeds to step S33, and when "NO" is selected, the first time out process is terminated. In step S33, it is judged to forcibly suspend the facsimile communication, and when it is a transmission from own machine, the finish time of the communication is written into the FAXID management table 8a. When it is a transmission from own machine or a transmission to the other end, an electronic mail of X-DCN signal (disconnect signal) is transmitted to the other end, the content of the signal is written into the communication record transmission table 8b or the communication record receiving table 8c, and the first time out process is terminated.

Further, for X-MCF signal to be used in the present embodiment, the receiving date, the process after a receiving (such as printing out, forwarding, storing), and the receiving result can be recorded. Moreover, the information such as the receiving ability and the receiving result of the Internet facsimile machine 20 can be noted in either the header part or the body part of the electronic mail. Furthermore, for the receiving ability of the Internet facsimile machine 20, capable/incapable of receiving a plural number of pages or the maximum volume of the mails can be noted, in addition to the paper size capable of being received and the resolution. In such case, the Internet facsimile machine 20 of the transmitting side transmits in TIFF file per one page corresponded to the other end machine, or transmits in TIFF file by dividing into several pages. In this case, an electronic mail of the receiving result is received per each electronic mail. Furthermore, according to the present embodiment, the Internet facsimile machine 20 of the receiving side is capable of specifying retransmission request to all pages or in a page unit, of the pages which had error in the receiving result. The Internet facsimile machine 20 of the transmitting side retransmits as requested.

According to the facsimile communication using the electronic mail of the present embodiment, the Internet facsimile machine 20 of the receiving side can transmit an electronic mail with X-FAXBUSY signal or the like added in the header part showing the fact of "during communication at the present time", in the case of failing to respond when a calling mail of the facsimile communication is received while a facsimile communication on electronic mail basis is being carried out between a different transmitting machine. Or the receiving side ignores an electronic mail of X-FAXCALL (calling) signal when receiving it(an electronic mail of X-FAXCALL signal). In those kinds of cases, the Internet facsimile machine 20 of the transmitting side can carry out a process of retransmitting X-FAXCALL signal after receiving that kind of electronic mail. The Internet facsimile machine 20 of the transmitting side transmits an electronic mail of X-FAXCALL signal several times, or carries out a process of retransmitting X-FAXCALL signal when there is no response for a prescribed period of time.

Furthermore, in the facsimile communication using the electronic mail according to the present embodiment, the time out time when both Internet facsimile machines 20 are waiting for an electronic mail can be decided by a phase beforehand, or the desirable waiting time can be written in the electronic mail to be transmitted.

As in the manner stated above, according to the second embodiment, as shown in FIG. 7, the principal control unit 1 exchanges the ability of the facsimile machine with that of the other end by an electronic mail, and transmits the image data of a plural number of pages in one electronic mail according to the exchanged ability of each facsimile machine. Therefore, comparing to the first embodiment, the image data can be transmitted under a simpler transmitting procedure. Moreover, the image data can be transmitted after exchanging the ability of one another, and the ability of the Internet facsimile machine of the other end can fully be performed. Furthermore, since the facsimile communication by the electronic mail is being carried out by using the communication procedure signal of the facsimile, the transmitting side can reliably confirm whether or not the receiving side has received, in reference to X-MCF signal or the like.

THIRD EMBODIMENT

Figure 12:
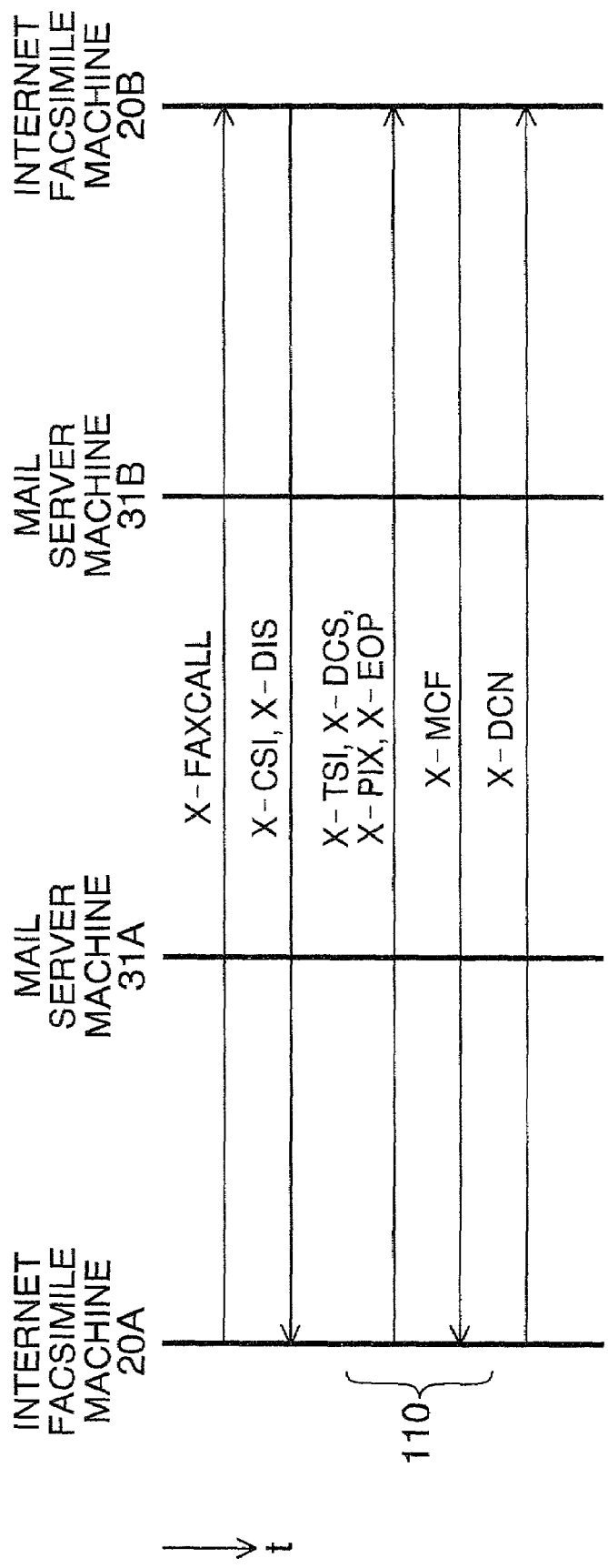
FIG. 12 is a diagram showing the condensing method of the procedure signal of when transmitting one page of image data, to be carried out by the Internet facsimile communication system according to the third embodiment of the present invention, and also a sequence diagram showing the communication procedure of the facsimile communication.
Figure 13:
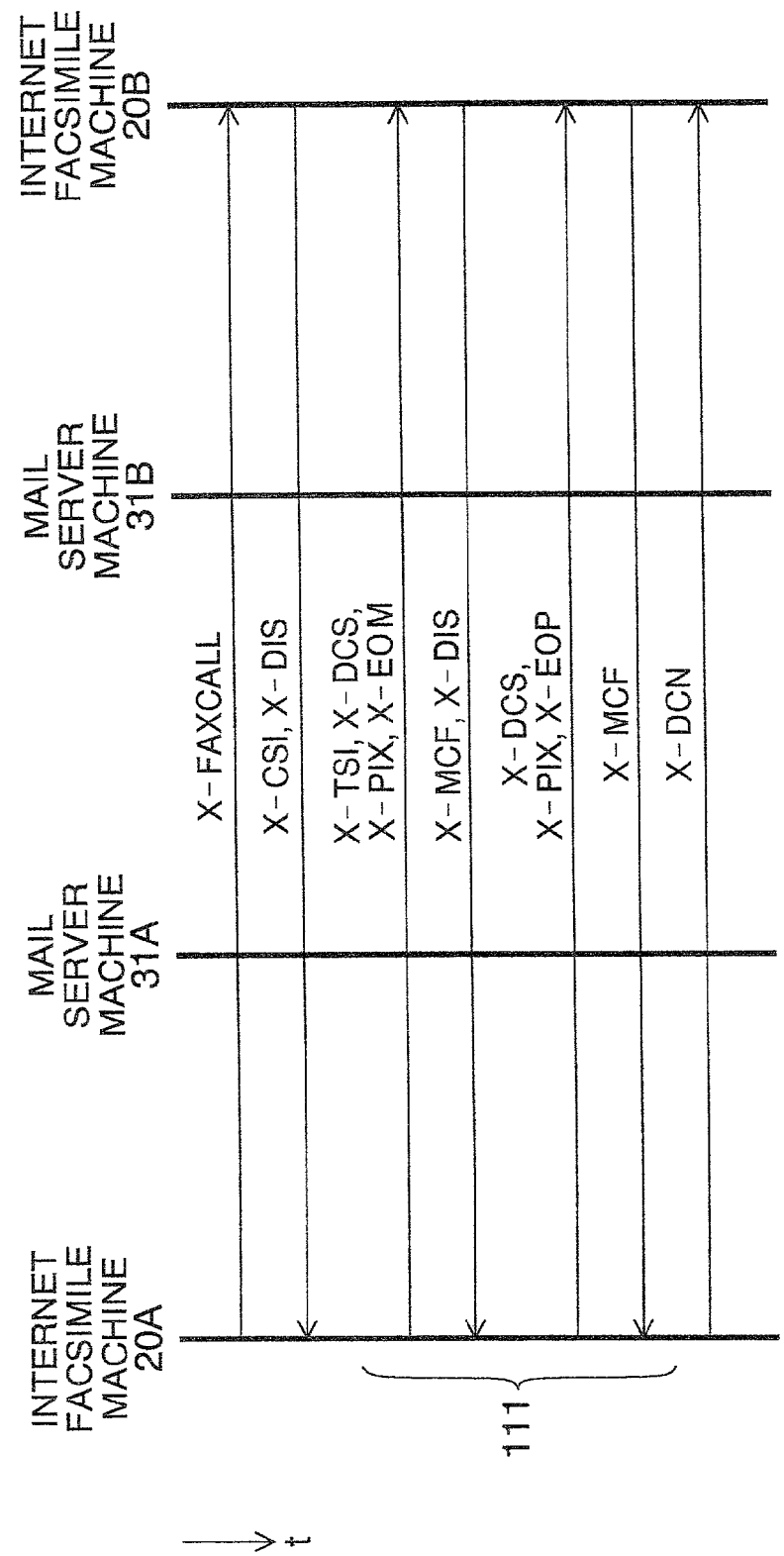
FIG. 13 is a diagram showing the condensing method of the procedure signal of when transmitting two pages of image data, to be carried out by the Internet facsimile communication system according to the third embodiment of the present invention, and also a sequence diagram showing the communication procedure of the facsimile communication.

FIG. 12 is a diagram showing the condensing method of the procedure signal of when transmitting one page of image data, to be carried out by the Internet facsimile communication system according to the third embodiment of the present invention, and also a sequence diagram showing the communication procedure of the facsimile communication. Moreover, FIG. 13 is a diagram showing the condensing method of the procedure signal of when transmitting two pages of image data, to be carried out by the Internet facsimile communication system according to the third embodiment of the present invention, and also a sequence diagram showing the communication procedure of the facsimile communication.

The Internet facsimile machine 20 according to the third embodiment has the same structure as the structure illustrated in FIG. 2. As shown in FIG. 12 and FIG. 13, the principal control unit 1 exchanges the ability of the facsimile machine with that of the other end by using electronic mail per one page of image data, and transmits the image data according to the exchanged ability of each facsimile machine. For example, as shown in FIG. 12, when transmitting one page of image data, the principal control unit 1 transmits X-TSI signal and X-DCS signal along with the one page of image data by one electronic mail. Moreover, as shown in FIG. 13, when transmitting an image data of a plural number of pages, the principal control unit 1 transmits in one electronic mail, X-TSI signal and X-DCS signal along with the image data of the first page, and then transmits in one electronic mail, X-DCS signal along with the image data of second page and onwards.

Furthermore, according to the third embodiment, the principal control unit 1 retransmits the image data of the previous page (step S63) in the case the ability of the facsimile machine cannot be exchanged with that of the other end concerning the image data of the next page ("YES" in step S62 shown in FIG. 17), even after a prescribed period of time elapses from the previous transmission of the image data.

Next, the condensing method of the procedure signal when transmitting one page of image data will be described in reference to FIG. 12. In FIG. 12, the Internet facsimile machine 20A transmits X-FAXCALL signal to the Internet facsimile machine 20B. When receiving X-FAXCALL signal, the Internet facsimile machine 20B transmits X-CSI, X-DIS signals to the Internet facsimile machine 20A. Next, the Internet facsimile machine 20A transmits X-TSI, X-DCS, X-PIX (for example, TIFF format by one page), X-EOP signals to the Internet facsimile machine 20B. Responding to this, the Internet facsimile machine 20B transmits X-MCF signal to the Internet facsimile machine 20A. Furthermore, the Internet facsimile machine 20A transmits X-DCN signal to the Internet facsimile machine 20B. The communication procedure of the facsimile communication when transmitting one page of image data completes here.

Furthermore, the condensing method of the procedure signal when transmitting two pages of image data will be described in reference to FIG. 13. In FIG. 13, the Internet facsimile machine 20A transmits X-FAXCALL signal to the Internet facsimile machine 20B. In response to this, the Internet facsimile machine 20B transmits X-CSI, X-DIS signals to the Internet facsimile machine 20A. Next, the Internet facsimile machine 20A transmits X-TSI, X-DCS, X-PIX (for example, TIFF format by the first page), X-EOM signals to the Internet facsimile machine 20B. Responding to this, the Internet facsimile machine 20B transmits X-MCF, X-DIS signals to the Internet facsimile machine 20A. Furthermore, the Internet facsimile machine 20A transmits X-DCS, X-PIX (for example, TIFF format by the second page), X-EOP signals to the Internet facsimile machine 20B. In response to this, the Internet facsimile machine 20B transmits X-MCF signal to the Internet facsimile machine 20A. Then, the Internet facsimile machine 20A transmits X-DCN signal to the Internet facsimile machine 20B. The communication procedure of the facsimile communication when transmitting two pages of image data completes here. Further, in the transmission of the image data of a plural number of pages of more than two pages, the image data is transmitted in the same manner as shown in FIG. 13.

In the communication procedure according to the third embodiment shown in FIG. 12, X-TSI, X-DCS, X-PIX (for one page), X-EOP signals are transmitted in one electronic mail (procedure of 110 in FIG. 12). Therefore, as the first embodiment shown in FIG. 6, comparing to the case in which transmitting X-TSI, X-DCS signals, and X-PIX (for one page), X-EOP signals in different electronic mails, the communication procedure can be greatly simplified. Moreover, the communication procedure according to the third embodiment shown in FIG. 13 can be greatly simplified as shown in code number 111, comparing to the first embodiment (procedure 101 shown in FIG. 6) shown in FIG. 6.

Figure 14:
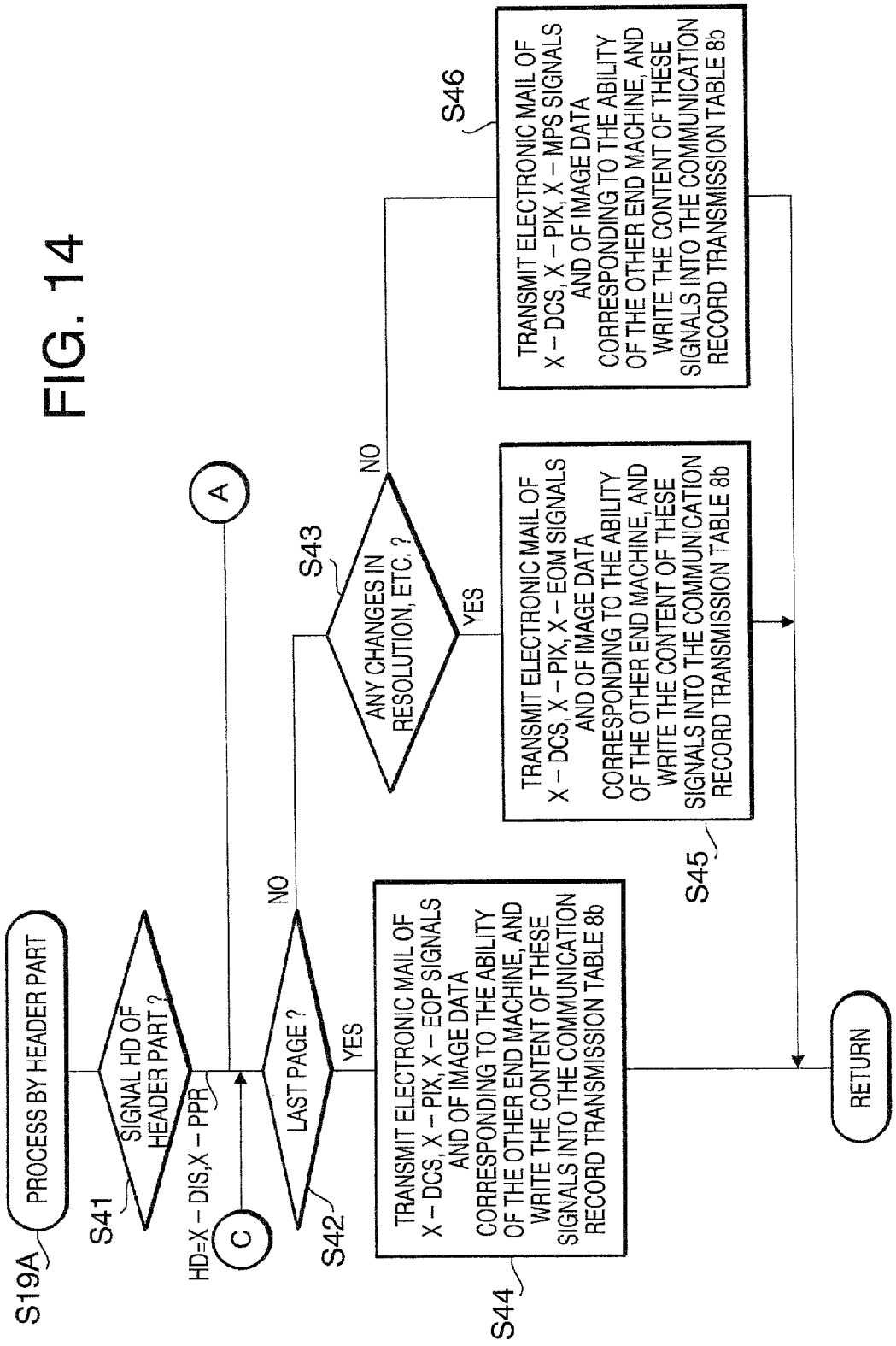
FIG. 14 is a flow chart showing the first part of the process by header part (step S19A) which is a subroutine to be carried out by the facsimile machine 20 according to the third embodiment of the present invention.
Figure 15:
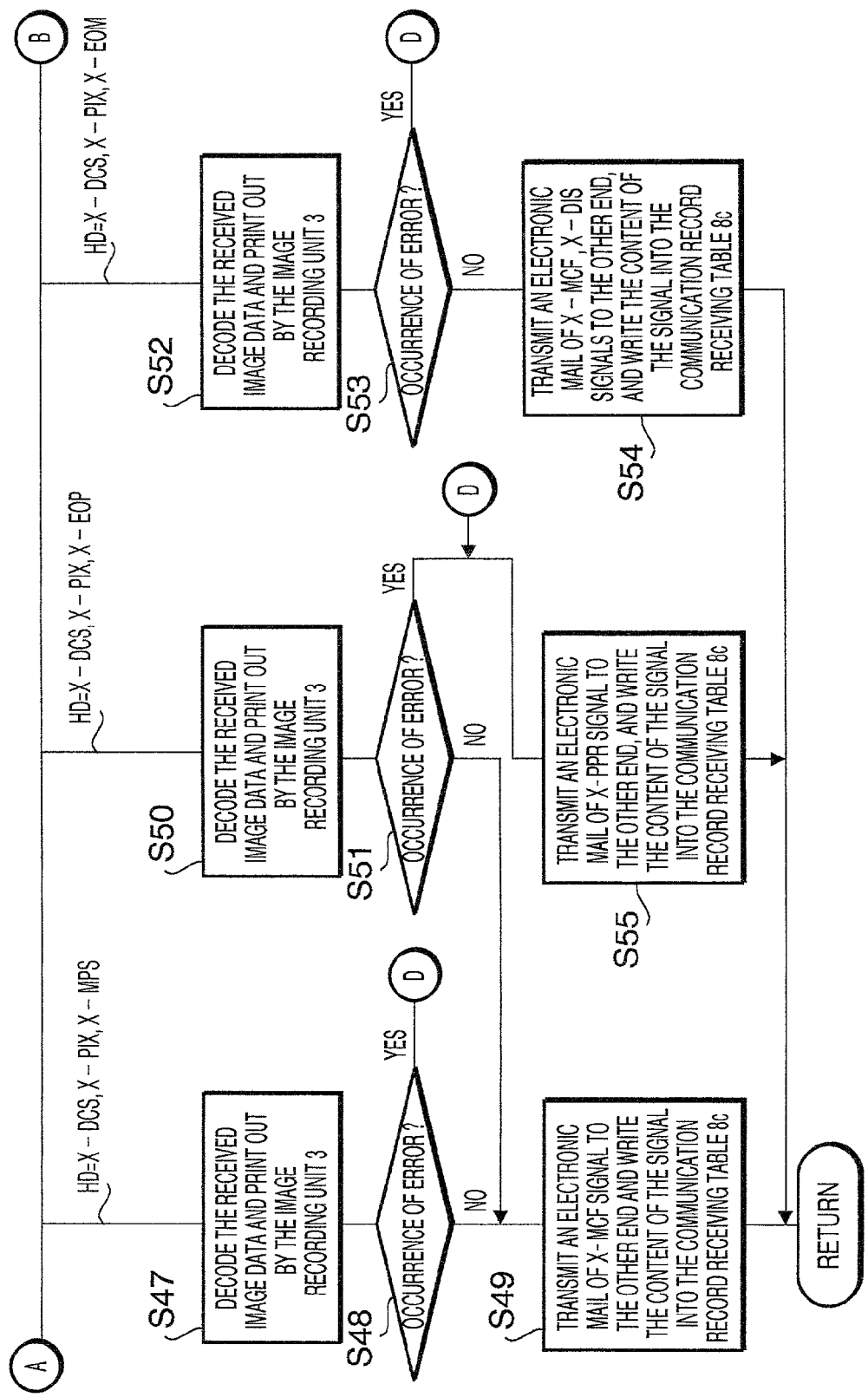
FIG. 15 is a flow chart showing the second part of the process by header part (step S19A) which is a subroutine to be carried out by the facsimile machine 20 according to the third embodiment of the present invention.
Figure 16:
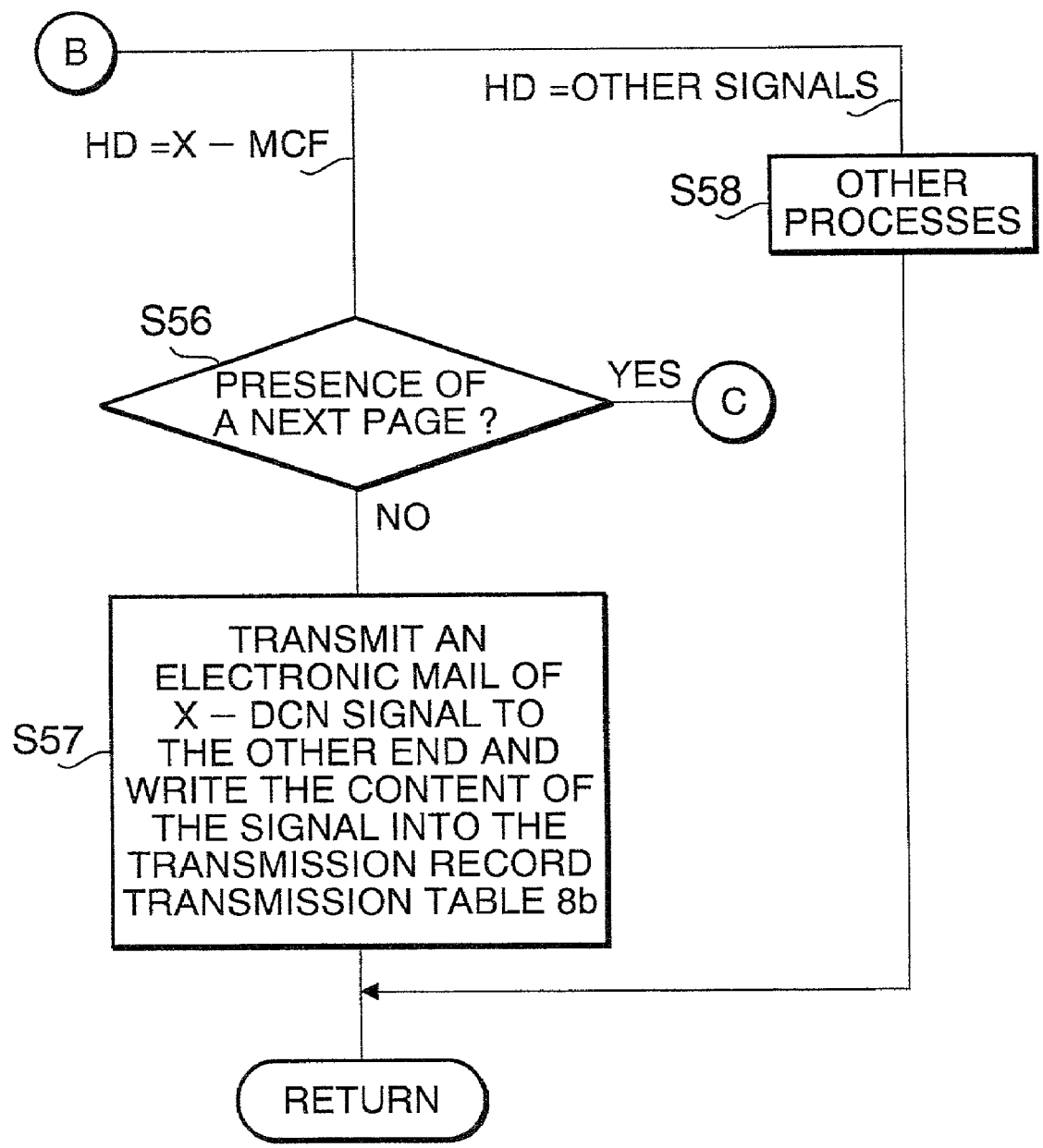
FIG. 16 is a flow chart showing the third part of the process by header part (step S19A) which is a subroutine to be carried out by the facsimile machine 20 according to the third embodiment of the present invention.

FIG. 14 through FIG. 16 are flow charts showing a process by header part (step S19A) which is a subroutine carried out by the facsimile machine 20 according to the third embodiment.

Referring to FIG. 14, in step S41, it is judged what the signal HD of the header part of the received electronic mail is, and it branches as follows according to the signal HD of the header part:

(a) Proceeds to step S42 when HD=X-DIS, X-PPR in FIG. 14.
(b) Proceeds to step S47 when HD=X-DCS, X-PIX, X-MPS in FIG. 15.
(c) Proceeds to step S50 when HD=X-DCS, X-PIX, X-EOP in FIG. 15.
(d) Proceeds to step S52 when HD=X-DCS, X-PIX, X-EOM in FIG. 15.
(e) Proceeds to step S56 when HD=X-MCF in FIG. 16.
(f) When HD=other signals in FIG. 16, the designated other processes are carried out according to the signal in step S58, and return to the original main routine.

In step S42 of FIG. 14, it is judged whether or not it is the last page and then, in step S43, it is judged whether or not there is any changes in the resolution or the like in the facsimile transmission. When "YES" is selected in step S42, it proceeds to step S44, and when "NO" is selected in step S42 and "YES" in step S43, it proceeds to step S45. When "NO" is selected in step S42 and "NO" in step s43, it proceeds to step S46. In step S44, an electronic mail of X-DCS, X-PIX, X-EOP signals and an image data corresponding to the ability of the other end machine are transmitted to the other end, the content of these signals are written into the communication record transmission table 8b, and it returns to the original main routine. Moreover, in step S45, an electronic mail of X-DCS, X-PIX, X-EOM signals and an image data corresponding to the ability of the other end machine are transmitted to the other end, the content of these signals are written into the communication record transmission table 8b, and it returns to the original main routine. Furthermore, in step S46, an electronic mail of X-DCS, X-PIX, X-MPS signals and an image data corresponding to the ability of the other end machine are transmitted to the other end, the content of these signals are written into the communication record transmission table 8b, and it returns to the original main routine.

In step S47 shown in FIG. 15, the received image data is decoded and printed out by the image recording unit 3. In step S48, it is judged whether or not an error has occurred in the processes such as the decoding process or the recording process. When "YES" is selected in step S48, it proceeds to step S55. On the other hand, when "NO" is selected, it proceeds to step S49. Next, in step S49, an electronic mail of X-MCF signal (message confirmation signal) is transmitted to the other end, the content of the signal is written into the communication record receiving table 8c, and it returns to the original main routine. Moreover, in step S50, the received image data is decoded, and printed out by the image recording unit 3. In step S51, it is judged whether or not an error has occurred in the processes such as the decoding process or the recording process. When "YES" is selected, it proceeds to step S55. On the other hand, when "NO" is selected, it proceeds to step S49. Furthermore, in step S52, the received image data is decoded, and printed out by the image recording unit 3. In step S53, it is judged whether or not an error has occurred in the processes such as the decoding process or the recording process. When "YES" is selected, it proceeds to step S55. On the other hand, when "NO" is selected, it proceeds to step S54. In step S54, an electronic mail of X-MCF, X-DIS signals is transmitted to the other end, the content of these signals are written into the communication record receiving table 8c, and it returns to the original main routine. Further, in step S55, an electronic mail of X-PPR signal is transmitted to the other end, the content of the signal is written into the communication record receiving table 8c, and it returns to the original main routine.

In step S56 of FIG. 16, it is judged whether or not there is a next page, and when "YES" is selected, it proceeds to step S42 shown in FIG. 14, and when "NO", it proceeds to step S57. In step S57, an electronic mail of X-DCN (disconnect signal) is transmitted to the other end, the content of the signal is written into the communication record transmission table 8b, and it returns to the original main routine.

Figure 17:
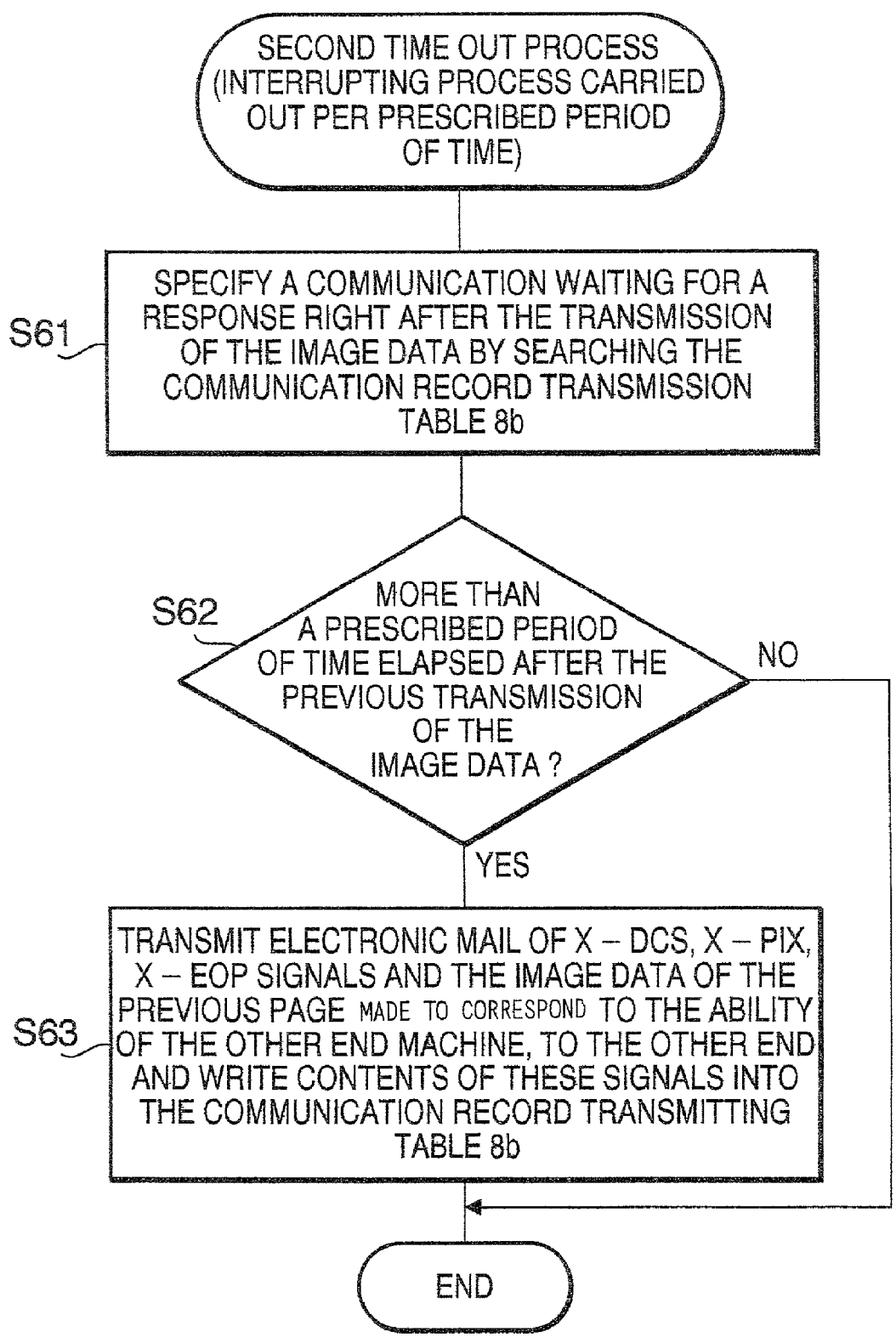
FIG. 17 is a flow chart showing the second time out process which is an interrupting process carried out per prescribed period of time by the Internet facsimile machine 20 according to the third embodiment of the present invention.

FIG. 17 is a flow chart showing the second time out process which is the interrupting process carried out per a prescribed period of time (for example, 30 seconds) by the Internet facsimile machine 20 according to the third embodiment. Referring to FIG. 17, in step S61, the facsimile communication waiting for a response right after the transmission of the image data is specified by searching the communication record transmission table 8b. In step S62, it is judged whether or not more than a prescribed period of time (for example, 5 minutes) has elapsed since the transmission of the previous electronic mail of the image data. When "YES" is selected, it proceeds to step S63, and when "NO", the second time out process is terminated. In step S63, an electronic mail of X-DCS, X-PIX, X-EOP and the image data of the previous page made to correspond to the ability of the other end machine are transmitted to the other end, the content of these signals are written into the communication record transmission table 8b, and the second time out process is completed.

According to the third embodiment, the Internet facsimile machine 20 of the transmitting side transmits in one electronic mail, X-DCS signal including the information concerning the image data to be transmitted, and X-MPS, X-EOP, or X-EOM signals which are the next ordering signals. Therefore, the communication procedure can be greatly abbreviated. Moreover, by attaching image data to the electronic mail with X-DCS signal recorded, the communication procedure can be even more simplified. Further, when the image data of X-PIX signal is to be TIFF format, since the information concerning the image data is written in the header part section of TIFF format, there is no need to add X-DCS signal separately. Furthermore, for example, the receiving ability or the receiving result of the Internet facsimile machine 20 of the receiving side can be recorded in the header part of the electronic mail or in the body part.

According to the third embodiment, as shown in the second time out process of FIG. 17, when the exchanging of electronic mails fails in the middle, after a prescribed period of time, the Internet facsimile machine 20 of the transmitting side tries retransmission from the next page of the page of which the transmission has been completed. In place of the former, all of the pages can be retransmitted.

As in the manner stated above, according to the third embodiment, as shown in FIG. 12 and FIG. 13, the principal control unit 1 exchanges the ability of the facsimile machine with that of the other end by using electronic mail per one page of image data, and transmits the image data based on the exchanged ability of each facsimile machine. Therefore, the ability of the Internet facsimile machine of the other end can be fully performed. Moreover, since the facsimile communication by the electronic mail is being carried out by the communication procedure signal of the facsimile, the transmitting side can reliably confirm whether or not the receiving side has received.

Transformed Example

Figure 18:
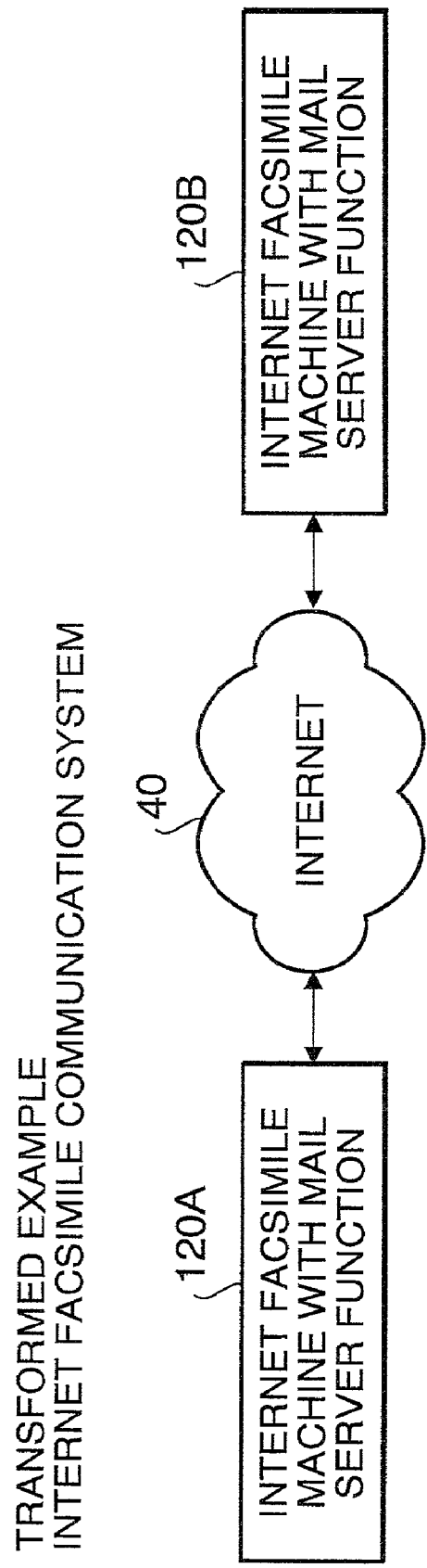
FIG. 18 is a block diagram showing the formation of the Internet facsimile communication system according to a transformed example.

In the embodiments described above, the Internet facsimile machine 20 and the mail server machine 31 are constructed of separate machines, both in the transmitting side and the receiving side. However, as shown in FIG. 18, the Internet facsimile machine 120A and the Internet facsimile machine 120B with mail server function including the functions of these two machines 20 and 31 can be provided. Moreover, at least one of the transmitting side or the receiving side can be provided with Internet facsimile machines 120A, 120B with mail server function. By providing a mail server function for transmitting and receiving electronic mails via the Internet, the receiving side no longer need to use POP3 protocol, and can carry out a communication just by SMTP protocol. Thus, the communicating time can be shorted even more.

What is claimed is:

1. An Internet facsimile machine comprising:
    an exchanging means for exchanging an ability of the facsimile machine with that of the other end by using an exchange electronic mail via the Internet; and
    a communicating means for transmitting an image data by using a transmit image electronic mail based on said exchanged ability of each facsimile machine; and
    a control means for interrupting the facsimile communication in a case where a transmit confirmation electronic mail in response to the transmit image electronic mail cannot be received within a prescribed period of time after said communicating means has transmitted the transmit image electronic mail.

2. An Internet facsimile machine according to claim 1 wherein said exchange electronic mail includes data for identifying the series of facsimile communication.

3. An Internet facsimile machine according to claim 1 wherein said exchanging means records the ability of each facsimile machine in the header part of said exchange electronic mail and exchanges with the facsimile machine of the other end.

4. An Internet facsimile machine according to claim 1 wherein said exchanging means records the ability of each facsimile machine in the body part of said exchange electronic mail and exchanges with the facsimile machine of the other end.

5. An Internet facsimile machine according to claim 1 wherein said communicating means includes the image data in the body part of said transmit image electronic mail and transmits the image data.

6. An Internet facsimile machine according to claim 1 wherein said communicating means includes the image data in an attached file of said transmit image electronic mail and transmits the image data.

7. An Internet facsimile machine according to claim 1 wherein said image data is TIFF format.

8. An Internet facsimile machine according to claim 1 wherein said image data is MH format, MMR format, JBIG format, or JPEG format.

9. An Internet facsimile machine according to claim 1 further comprising:
    a mail server means for transmitting and receiving the electronic mails via the Internet.

10. An Internet facsimile machine according to claim 1 wherein said communicating means transmits a plural number of pages of image data by one electronic mail based on said exchanged ability of each facsimile machine.

11. A facsimile machine according to claim 10 wherein a communicating means receives image data transmitted in a receive image electronic mail, carries out a designated receiving process, and transmits to the facsimile machine of the other end, a receive confirmation electronic mail showing the result of said receiving process carried out.

12. A facsimile machine according to claim 10 wherein a communicating means transmits an electronic mail showing a retransmission request to the facsimile machine of the other end when there is inadequacy in part of or all of the received image data by the receive image electronic mail.

13. A facsimile machine according to claim 10 wherein a communicating means transmits an electronic mail stating the fact of failure in the receiving to the facsimile machine of the other end, in the case the image data transmitted by using the receive image electronic mail cannot be received.

14. An Internet facsimile machine according to claim 1 wherein said exchanging means exchanges the ability of each facsimile machine with that of the other end by electronic mail per one page of image data, and said communicating means transmits the image data based on the exchanged ability of each facsimile machine.

15. An Internet facsimile machine according to claim 14 wherein said exchanging means and said communicating means transmit in one electronic mail a transmitting subscriber identification signal and a digital command signal along with said one page of image data when transmitting one page of image data.

16. An Internet facsimile machine according to claim 14 wherein said exchanging means and said communicating means transmit in one electronic mail the transmitting subscriber identification signal and the digital command signal along with the image data of the first page, and then transmit in one electronic mail the digital command signal along with the image data of the second page and onwards, when transmitting an image data of a plural number of pages.

17. An Internet facsimile machine according to claim 14 wherein said communicating means retransmits the image data of the previous page when the ability of the facsimile machine cannot be exchanged with that of the other end concerning the image data of the next page even after a prescribed period of time has elapsed from the transmission of the previous image data.

* * * * *